United States Patent
Chand et al.

(10) Patent No.: US 8,086,649 B1
(45) Date of Patent: *Dec. 27, 2011

(54) INCREMENTAL ASSOCIATION OF METADATA TO PRODUCTION DATA

(75) Inventors: Sujeet Chand, Brookfield, WI (US); Stephen C. Briant, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,250

(22) Filed: Jun. 7, 2010

Related U.S. Application Data

(63) Continuation of application No. 11/240,336, filed on Sep. 30, 2005, now Pat. No. 7,734,590.

(51) Int. Cl.
*G06F 17/30* (2006.01)
(52) U.S. Cl. ........................................ 707/803
(58) Field of Classification Search .................. None
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,301,320 A | 4/1994 | McAtee et al. |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |

(Continued)

FOREIGN PATENT DOCUMENTS

CN 1636211 A 7/2005

(Continued)

OTHER PUBLICATIONS

Pitzek, et al., Configuration and Management of a Real-Time Smart Transducer Network, 2003 IEEE, 2003, 4 pages.

(Continued)

*Primary Examiner* — Baoquoc To
(74) *Attorney, Agent, or Firm* — Turocy & Watson, LLP; Alexander Kuszewski; John Miller

(57) ABSTRACT

The claimed subject matter provides a system and/or method that facilitates utilizing metadata appended to data related to an industrial automation environment with a controller that is associated with a hierarchically structured data model. An interface component can facilitate receipt of data associated with at least one of an instruction set, a configuration, and a collection. An append component can affix metadata to at least one of the instruction set, the configuration, and the collection, wherein the metadata conforms to a hierarchically structured data model.

20 Claims, 11 Drawing Sheets

U.S. PATENT DOCUMENTS

| | | |
|---|---|---|
| 5,644,740 A | 7/1997 | Kiuchi |
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sonderegger |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,523,042 B2 | 2/2003 | Milleker et al. |
| 6,539,271 B2 | 3/2003 | Lech et al. |
| 6,539,430 B1 | 3/2003 | Humes |
| 6,539,458 B2 | 3/2003 | Holmberg |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,117,049 B2 | 10/2006 | Horn et al. |
| 7,434,226 B2 * | 10/2008 | Singh ............................ 719/313 |
| 7,734,590 B2 | 6/2010 | Chand et al. |
| 2002/0012401 A1 | 1/2002 | Karolys et al. |
| 2002/0013748 A1 | 1/2002 | Edmison et al. |
| 2002/0049959 A1 | 4/2002 | Horn et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0143735 A1 | 10/2002 | Ayi et al. |
| 2002/0194577 A1 | 12/2002 | Connor et al. |
| 2003/0014387 A1 | 1/2003 | Kreidler et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0149608 A1 | 8/2003 | Kall et al. |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0039993 A1 | 2/2004 | Kougiouris et al. |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0167790 A1 | 8/2004 | Grasse |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2005/0005289 A1 | 1/2005 | Adolph et al. |
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |

| | | | |
|---|---|---|---|
| 2005/0129247 A1 | 6/2005 | Gammel et al. | |
| 2005/0135782 A1 | 6/2005 | Ando et al. | |
| 2005/0154741 A1 | 7/2005 | Hebert et al. | |
| 2005/0166215 A1 | 7/2005 | Holloway et al. | |
| 2005/0177687 A1 | 8/2005 | Rao | |
| 2005/0187925 A1 | 8/2005 | Schechinger et al. | |
| 2005/0198248 A1 | 9/2005 | Morimoto et al. | |
| 2005/0216460 A1 | 9/2005 | Yoon et al. | |
| 2005/0223010 A1 | 10/2005 | Murray | |
| 2005/0251527 A1 | 11/2005 | Phillips et al. | |
| 2005/0256788 A1 | 11/2005 | Mukai | |
| 2005/0268253 A1 | 12/2005 | Johnson et al. | |
| 2005/0278373 A1 | 12/2005 | Corbett et al. | |
| 2006/0004475 A1 | 1/2006 | Brackett et al. | |
| 2006/0004847 A1 | 1/2006 | Claudatos et al. | |
| 2006/0130050 A1 * | 6/2006 | Betts et al. | 717/171 |
| 2006/0168013 A1 | 7/2006 | Wilson et al. | |
| 2007/0009158 A1 | 1/2007 | Geva et al. | |

FOREIGN PATENT DOCUMENTS

| | | |
|---|---|---|
| CN | 1945473 A | 11/2007 |
| CN | 100470555 | 3/2009 |
| EP | 1376281 A | 1/2004 |
| EP | 1770463 A1 | 4/2007 |
| WO | 03071455 A2 | 8/2003 |
| WO | 2005010625 A2 | 2/2005 |

OTHER PUBLICATIONS

European Search Report dated Jun. 12, 2005 for European Patent Application Serial No. EP05016793, 3 pages.
Kubiatowicz, et al. "OceanStore: An Architecture for Global-Scale Persistent Storage" ASPLOS 2000, Cambridge, Massachusetts (2000).
Goldman, et al. "From Semistructured Data to XML: Migrating the Lore Data Model and Query Language" (1999).
OA mailed Sep. 15, 2009 for U.S. Appl. No. 11/240,336, 17 pages.
OA mailed Oct. 16, 2008 for U.S. Appl. No. 11/240,336, 18 pages.
OA mailed Mar. 17, 2009 for U.S. Appl. No. 11/240,336, 18 pages.
OA mailed May 13, 2008 for U.S. Appl. No. 11/240,336, 16 pages.
OA mailed Nov. 1, 2007 for U.S. Appl. No. 11/240,336, 27 pages.
CN OA dated Jun. 23, 2008 for Chinese Patent Application No. 200610142165.8, 15 pages.
EP OA dated Sep. 26, 2007 for EP Application No. 06019815.7, 1 page.
European Search Report dated Jan. 29, 2007 for European Patent Application No. EP06019815, 2 pages.
OA dated Aug. 20, 2010 for U.S. Appl. No. 12/795,284, 38 pages.
Notice of Allowance dated May 6, 2011 for U.S. Appl. No. 12/795,284, 33 pages.

* cited by examiner

INCREMENTAL ASSOCIATION OF METADATA TO PRODUCTION DATA

CROSS REFERENCE TO RELATED APPLICATIONS

This application is a continuation of U.S. patent application Ser. No. 11/240,336, filed on Sep. 30, 2005, entitled "INCREMENTAL ASSOCIATION OF METADATA TO PRODUCTION DATA", the entirety of which is incorporated herein by reference.

TECHNICAL FIELD

The subject innovation relates to industrial control systems and, more particularly, to enabling utilization of legacy devices when updating an industrial control system data model.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

As can be discerned from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Furthermore, updating data structures of controllers is associated with another array of implementation problems. For instance, some legacy controllers or other devices may not be associated with sufficient memory and/or processing power to support an updated application, and it is not cost effective for a company to replace every controller within an enterprise. Therefore, not only will multiple copies of data be existent within an industrial automation environment, but multiple copies of disparately structured data will be existent upon a network. Applications may require disparate mapping modules to enable mapping between controllers associated with first and second architectures. Thus, simply updating an architecture of controllers does not alleviate current deficiencies associated with industrial controllers in an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate utilizing metadata appended to data related to an industrial automation environment with a controller that is associated with a hierarchically structured data model. An append component can affix metadata to data, wherein the data is received via an interface. Thus, the append component can append informative metadata to the data received (e.g., instruction set, configuration of manufacturing and/or automation systems, collected data, etc.) to provide the common definition utilized in connection with a hierarchically structured data model. A physical location hierarchy of an industrial automation environment (e.g., a plant, factory, manufacturing facility, etc.) can be associated with the hierarchically structured data model. The metadata with data can relate to the hierarchically structured data model that utilizes a naming convention, wherein the naming convention for a variable, a tag (e.g., an input and/or output of a PLC, including physical and virtual), and/or automation device can relate to a physical hierarchy of the industrial automation environment.

In accordance with one aspect of the claimed subject matter, the append component can utilize a distribute component that facilitates distributing the metadata with data to systems and/or components. The distribute component can utilize at least one of a directory service, a caching service, and a storage service to enable the metadata with data to be distributed to a participating system. In accordance with another aspect of the claimed subject matter, the append component can utilize a validate component that validates the integrity of the metadata with data, data, metadata, and/or modifications associated therewith. The validate component can further impose multiple versions of the metadata to facilitate correct execution throughout disparate systems and/or components.

In accordance with another aspect of the innovation described herein, the append component can utilize a security component to provide security mechanisms to ensure proper privileges and/or rights associated with specific user manipulations. The security component can provide at least two levels for any modification and/or manipulation related to metadata and/or templates. In accordance with yet another aspect of the claimed subject matter, a bridge component can be utilized by the append component. The bridge component facilitates networking within the industrial automation environment, wherein the bridge component can act as a network bridge. Thus, data carried by disparate networks can be manipulated so that it conforms to a common network. In other aspects of the claimed subject matter, methods are provided that facilitate utilizing metadata appended to data related to an industrial automation environment with a controller that is associated with a hierarchically structured data model.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
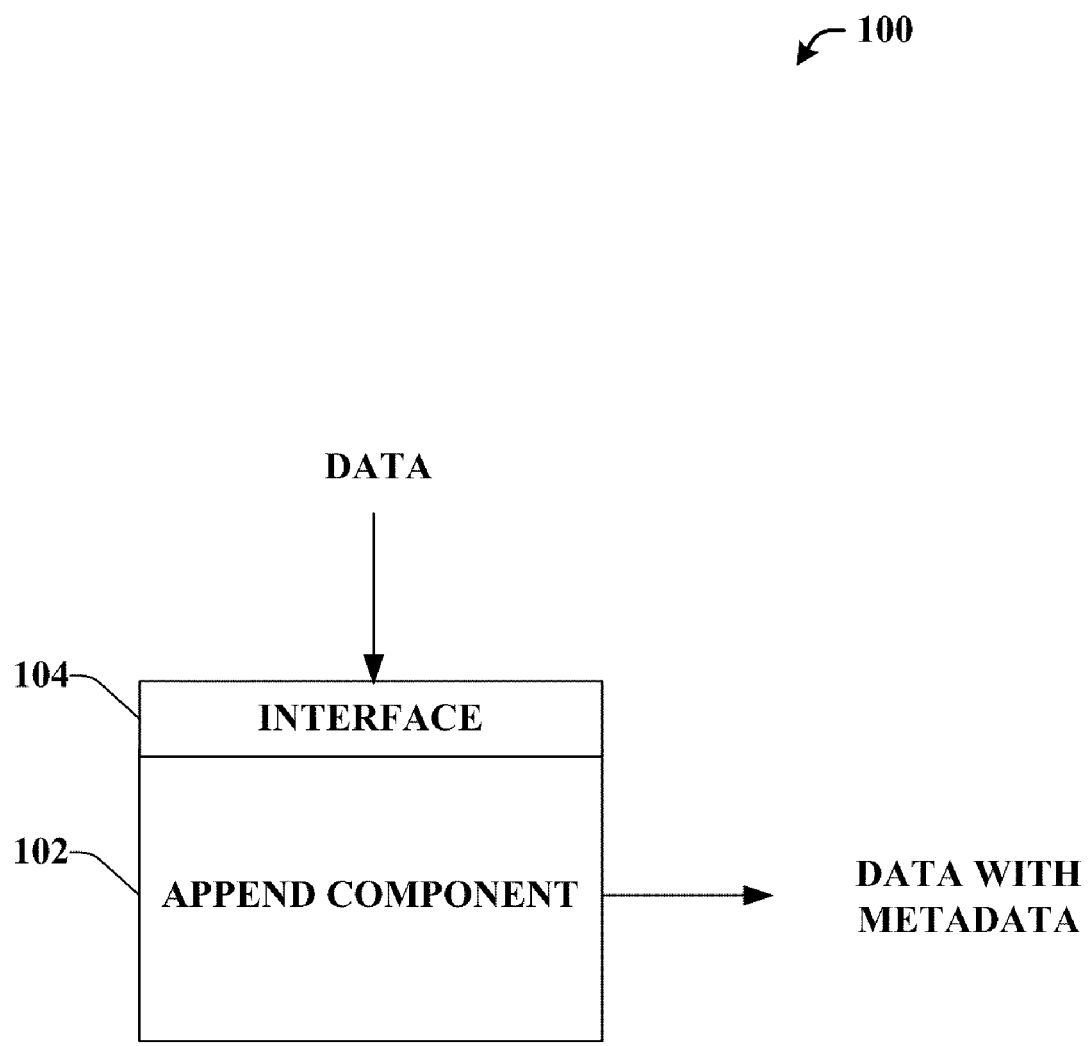
FIG. 1 illustrates a block diagram of an exemplary system that facilitates appending data related to an industrial automation environment with metadata.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates appending data related to an industrial automation environment with metadata. In particular, a common definition can utilize metadata associated to the industrial automation environment, wherein the common definition can include any and/or at least a portion of aspects of such system such that the common definition is accessible during manufacturing. An append component 102 can affix metadata to data received via an interface 104 such that the data describes data (e.g., data about data). The append component 102 can affix metadata to any data related to the industrial automation environment and/or the manufacturing systems associated with a product.

For instance, the manufacturing of a product is driven by a demand, wherein the demand can be represented by a set of instructions and/or data. The instruction set combined with a configuration of manufacturing and/or automation systems can provide manufacturing and/or industrial automation environments with the necessary data to produce products to meet the demand. Moreover, collected data or data related to the product can be utilized to manufacture the product. Thus, the append component 102 can append informative metadata to the data received (e.g., instruction set, configuration of manufacturing and/or automation systems, collected data, etc.) to provide the common definition utilized in connection with a hierarchically structured data model.

The hierarchically structured data model can be based at least in part upon the physical location of devices, controllers, and/or components within the industrial automation environment. For instance, the hierarchically structured data model can utilize a naming convention for any variable, component, and/or device such that the reference can include physical location within the hierarchy of the industrial automation environment. In one particular example, the hierarchical data model can be modeled after ISA_S88, ISAS95, and/or a combination thereof. It is understood, however, that any manner of hierarchically configuring a factory can be utilized in connection with modeling.

By utilizing the append component 102, a common definition can be utilized with the industrial automation environment such that any data received via the interface 104 is defined from the point where demand is presented to manufacturing to the point where the record about how a product was manufactured is returned. Furthermore, the common definition that utilizes metadata with data related to the industrial automation environment to allow constant accessibility to any component, device, variable, and/or disparate system. In addition, the following can be provided by affixing metadata to data utilizing the append component 102: validation mechanisms to ensure integrity of metadata affixed to data and/or any manipulations to the metadata affixed to data utilizing at least a portion of a template implementing a service (e.g., discoverable service, set of services, etc.); maintaining a version of metadata affixed to data wherein any data related to the manufacturing can include multiple versions; seamless distribution to participating systems during communication outages; distribution to various system endpoints from external systems to allow for configuration based at least in part upon a template; modification of templates and/or metadata affixed to data can be restricted by a set of rules and/or patterns; and enhanced security measures to ensure the integrity of any data manipulation related to the system 100.

In one example, the append component 102 can add on metadata to data received via the interface 104 such that the metadata can be associated with two general classes and/or sets of metadata or templates delivered with each system. A first general class and/or set of metadata can include system configuration metadata. The system configuration metadata or templates can adversely affect operation and/or safety of a delivered system if altered and/or extended. A second general class and/or set of metadata can include physical templates, procedural templates, and/or definition for materials (e.g., work orders, recipes, etc.). The physical templates, procedural templates, and/or definition for materials can be standards-based but can be modified to include a user's intellectual property and/or unique methods.

In another example, the append component 102 can incrementally add metadata utilizing a plurality of configured components that add data upon receipt of data and/or at some later time after receipt of the data. Moreover, such plurality of configured components can perform a number of activities upon inspection and/or receipt of the data including, but not limited to, collecting and/or manipulating information for later use (e.g., aggregation), initiating new messages to other disparate systems (e.g., propogation), updating fields in the message which have been replaceable parameters specified that the component can resolve (e.g., resolution), etc. Furthermore, the association of metadata can be performed by updating messages, generating associative links, techniques associated with messaging pipeline in a production model, etc.

Furthermore, the system 100 can include any suitable and/or necessary interface component 104 (herein referred to as "interface 104"), which provides various adapters, connectors, channels, communication paths, etc. to integrate the append component 102 into virtually any operating and/or database system(s). The interface 104 can receive data, wherein the data received can relate to an industrial automation environment, a set of instructions related to a demand for a product within manufacturing, configuration data associated with manufacturing and/or automation systems; collected data about a product, any suitable data related to a product manufactured within an industrial automation environment, etc. In addition, the interface component 104 can provide various adapters, connectors, channels, communication paths, etc., that provide for interaction with the append component 102.

Figure 2:
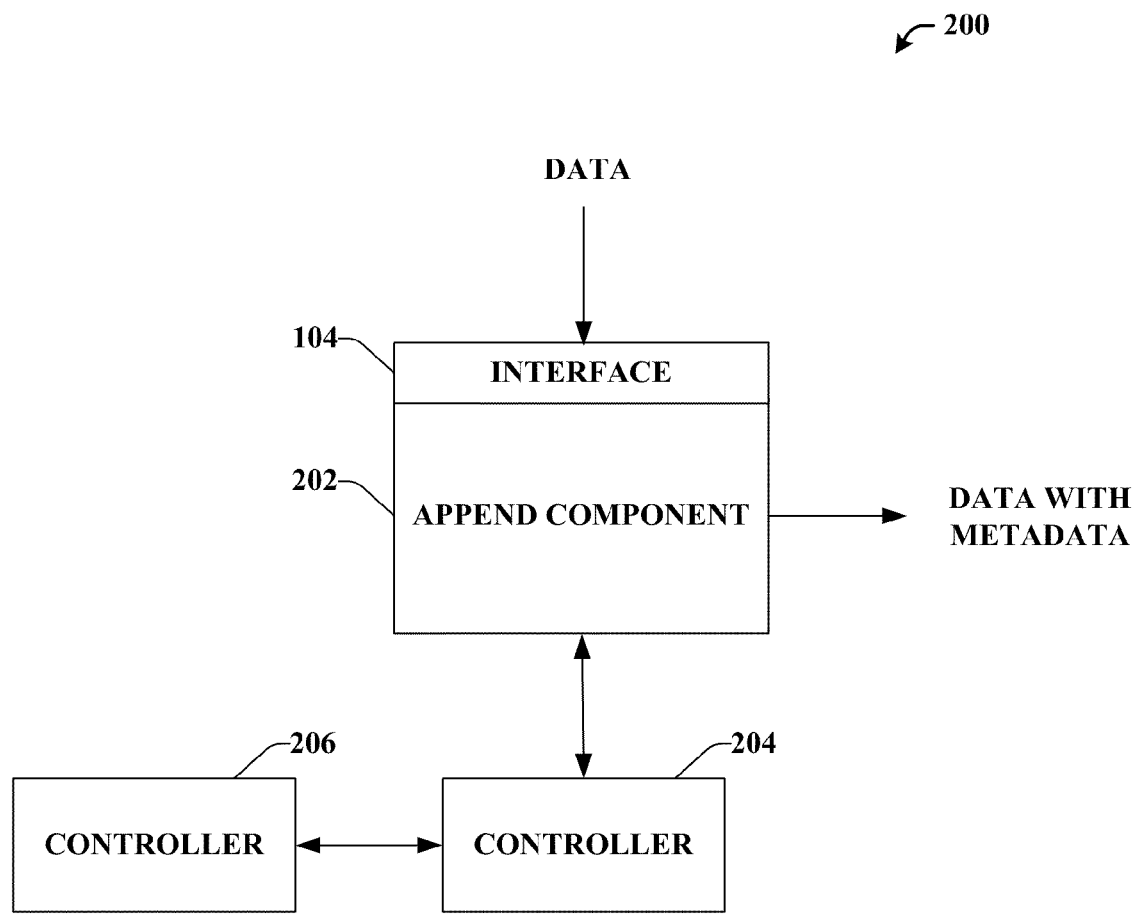
FIG. 2 illustrates a block diagram of an exemplary system that facilitates utilizing metadata appended to data related to an industrial automation environment with a controller that is associated with a hierarchically structured data model.

FIG. 2 illustrates a system 200 that facilitates utilizing metadata appended to data related to an industrial automation environment with a controller that is associated with a hierarchically structured data model. An append component 202 can affix metadata to data related to an industrial automation environment that utilizes a hierarchically structured data model, wherein the metadata affixed with data incorporates a common definition for the system 100 that includes all aspects of such system 100. The data received via the interface 104 can be, for instance, any data related to a manufacturing process for a product, a manufacturing instruction set, a manufacturing and/or automation system configuration, data related to a product, etc. It is to be appreciated that the append component 202 can be substantially similar to the append component 102 as described in FIG. 1.

The metadata generated by the append component 202 can be utilized by a controller 204 that conforms to the hierarchically structured data model. In accordance with an aspect of the subject innovation, the controller 204 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 200 as the controller 204, it is to be understood that any suitable automation controller can be employed in connection with the claimed subject matter. For example, any suitable microprocessor and/or microcontroller can be utilized within the system 200 as the controller 204. Moreover, it is to be appreciated that the controller 204 can contain software components and hardware components having inputs and/or outputs that can be utilized in connection with automating an industrial manufacturing device/process. In addition, it is to be understood that the append component 202 can be utilized by a plurality of controllers and for the sake of brevity throughout the subject innovation, a single controller is depicted but the claimed subject matter is not so limited.

In addition, the controller 204 can be associated with the physical location hierarchy of an industrial automation environment (e.g., a plant, factory, manufacturing facility, etc.). The physical location hierarchy of an industrial automation environment can be based at least in part upon the hierarchically structured data model. In one particular example, the hierarchical data model can be modeled after ISA_S88, ISAS95, and/or a combination thereof. It is understood, however, that any manner of hierarchically configuring a factory can be utilized in connection with modeling.

For instance, the controller 204 can relate to the hierarchically structured data model that utilizes a naming convention, wherein the naming convention for a variable, a tag (e.g., an input and/or output of a PLC, including physical and virtual), and/or automation device can relate to a physical hierarchy of the industrial automation environment. For example, the physical hierarchy of the industrial automation environment can be indicative of a factory-level, a cell-level, a subcell level, input and outputs within each subcell, and the like. In one example, the physical hierarchy of the industrial automation environment can be enterprise, plant, site, cell, machine, automation device. For example, a first photo eye on controller 5, in cell A, in the Smithville Plant that is for packaging associated with a Chip Factory can be referenced as "ChipFactory/Packaging/SmithvillePlant/CellA/Controller5/photoeye1." By utilizing such a naming convention, tags, names, and/or references need not be unique, programming can be more generalized, reused, code can be more descriptive as well as information derived from code.

The system 200 also includes another controller 206, which, like the controller 204, can utilize the metadata created by the append component 202. Further, the controller 204 and the controller 206 can exchange data utilizing conventional data-exchange methods within the industrial automation environment. Moreover, the controllers 204 and 206 can control factory floor devices without sacrificing operability and/or efficiency while obtaining an ability to utilize metadata generated by the append component 202.

Figure 3:
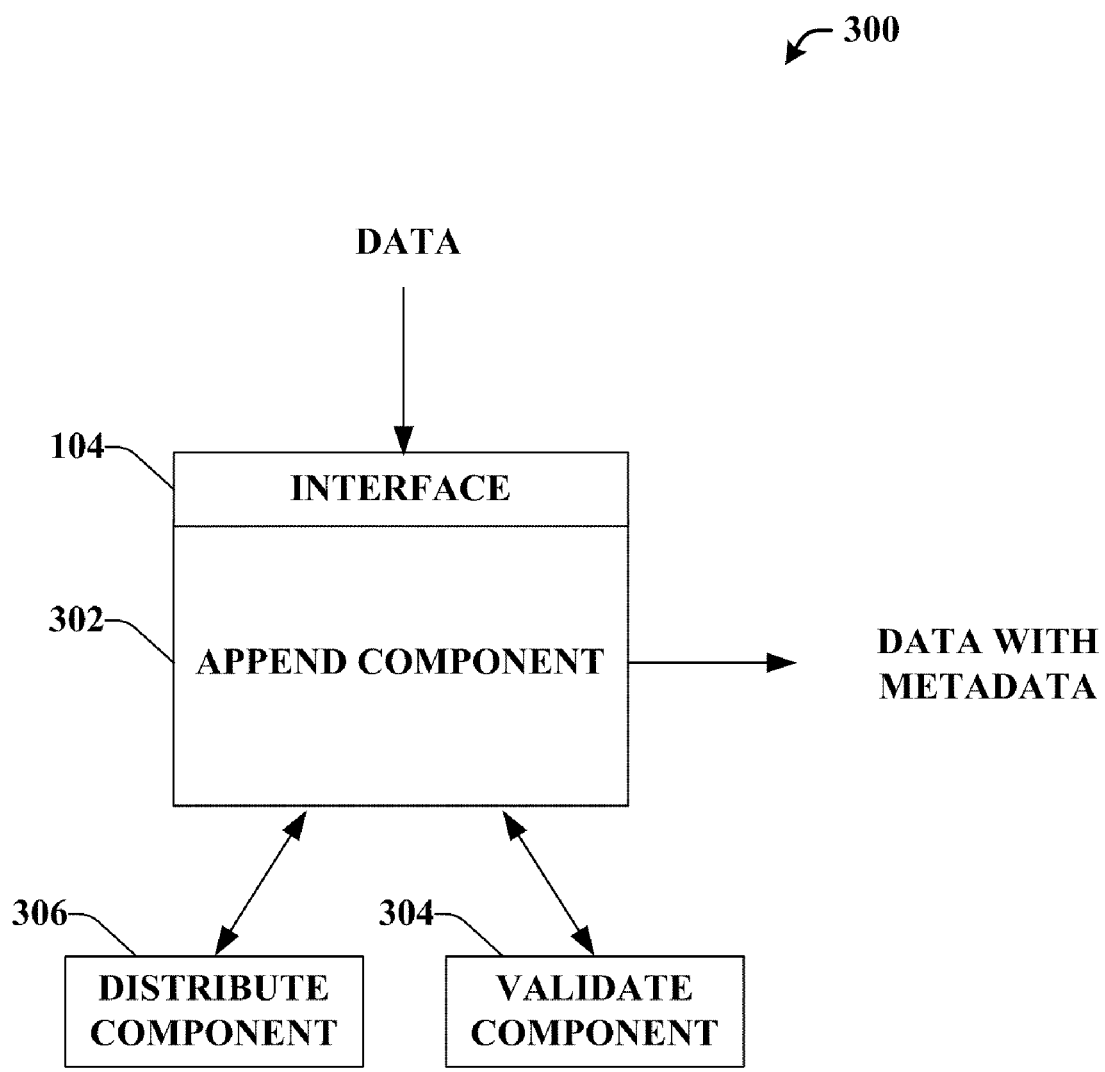
FIG. 3 illustrates a block diagram of an exemplary system that facilitates distributing validated metadata related to an industrial automation environment.

FIG. 3 illustrates a system 300 that facilitates distributing validated metadata related to an industrial automation environment. The append component 302 can receive data via the interface 104, wherein the data can be affixed with additional data referred to as metadata. The data with affixed metadata is self-describing such that the metadata is part of the data. The append component 302 can affix metadata to data such as, but not limited to, instructions, configurations, and/or collections. Moreover, it is appreciated that the append component 302 can be substantially similar to previously described components in previous figures.

In another example, the append component 302 can incrementally add metadata utilizing a plurality of configured components that add data upon receipt of data and/or at some later time after receipt of the data. Moreover, such plurality of configured components can perform a number of activities upon inspection and/or receipt of the data including, but not limited to, collecting and/or manipulating information for later use (e.g., aggregation), initiating new messages to other disparate systems (e.g., propogation), updating fields in the message which have been replaceable parameters specified that the component can resolve (e.g., resolution), etc. Furthermore, the association of metadata can be performed by updating messages, generating associative links, techniques associated with messaging pipeline in a production model, etc.

The append component 302 can include a validate component 304 that provides validation and versioning with the metadata attached with the received data. The validate component 304 can ensure the integrity of manipulations related to the metadata with data. Thus, any changes to the metadata can be maintained and/or versioned such that any and all data related to the manufacturing and/or industrial automation environment. The validate component 304 ensures consistency with the metadata and the version of such metadata utilized. Moreover, the validate component 304 can provide multiple versions of metadata with data based at least in part upon various manipulations and/or changes made therewith.

Furthermore, the validate component 304 can ensure the integrity of data manipulations and/or metadata manipulations utilizing a template. The template and/or appropriate template can be validated utilizing, for instance, a discoverable service and/or a set of services. Not only is the integrity of existing data and/or metadata validated, any created metadata with data can be verified. It is to be appreciated that any metadata with data described above can follow defined patterns and/or templates for any data within the system 300. The manipulation of the metadata with data and/or the manipulation of templates in the system 300 can be restricted by a set of rules and/or patterns. These rules and/or patterns can be self-describing and can be referenced by a set of callable services each time extensibility is necessary. Moreover, due to the nature and complexity of modern manufacturing and/or automation systems, a plurality of patterns and/or templates can be utilized for multiple users and/or applications. Thus, the metadata with data can be extended from a shipped product or pre-defined information.

The append component 302 can further utilize a distribute component 306 that facilitates distribution of the data with metadata to systems and/or components. The distribute component 306 can utilize at least one of a directory service, a caching service, and a storage service to enable the metadata with data to be distributed to a participating system. Moreover, the distribute component 306 can provide the distribution of the metadata with data to a participating system during a communication outage and/or loss. In particular, the distribute component 306 can provide metadata with data distribution to server based applications and/or controller based applications. In another example, the demand from an external system can be picked up by a system endpoint, wherein the system endpoints can be configured for the appropriate template(s) based at least in part upon the expected data for such particular system endpoint.

Figure 4:
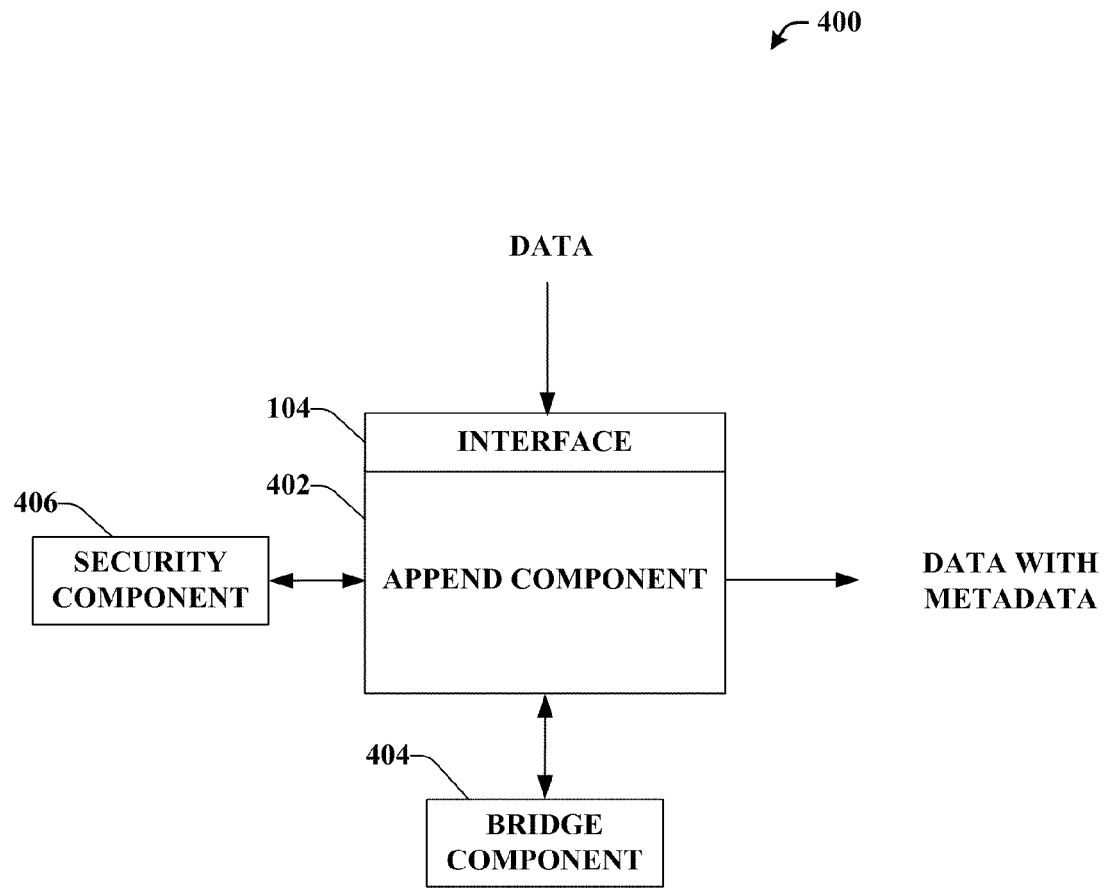
FIG. 4 illustrates a block diagram of an exemplary system that facilitates implementing a common definition that utilizes metadata for data related to an industrial automation environment.

FIG. 4 illustrates a system 400 that facilitates implementing a common definition that utilizes metadata for data related to an industrial automation environment. It is to be appreciated that the controller 408 can be substantially similar to controllers described in previous figures. The following can be provided by affixing metadata to data utilizing the append component 402: validation mechanisms to ensure integrity of metadata affixed to data and/or any manipulations to the metadata affixed to data utilizing at least a portion of a template implementing a service (e.g., discoverable service, set of services, etc.); maintaining a version of metadata affixed to data wherein any data related to the manufacturing can include multiple versions; seamless distribution to participating systems during communication outages; distribution to various system endpoints from external systems to allow for configuration based at least in part upon a template; and modification of templates and/or metadata affixed to data can be restricted by a set of rules and/or patterns.

In addition, a bridge component 406 can facilitate networking within the industrial automation environment. In other words, the bridge component 404 can act as a network bridge. Thus, data carried by disparate networks can be manipulated so that it conforms to a common network. Accordingly, the bridge component 404 can recognize a network protocol associated with received instructions related to the controller 408 and perform operations to convert such data so that it conforms to a pre-defined protocol. Upon such conversion, a mapping can be employed to convert the data so that it conforms to the hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Moreover, the bridge component 406 can support various disparate networks for the communication of the distributed transaction such as, but not limited to, Ethernet, ControlNet, DeviceNet, USB, etc. In other words, the system 400 utilizing the bridge component 406 can be network agnostic. In addition, the bridge component 406 can support both open and where necessary proprietary protocols to communicate the transaction over the various disparate networks.

The append component 402 can implement a security component 406 that provides enhanced security measures to ensure the integrity of any data manipulation related to the system 400. In other words, the security component 406 can utilize a security mechanism with at least two or more levels in relation to any modifications and/or manipulations of any metadata with data and/or templates in the system 400. In one example, the security component 406 can provide usernames and respective passwords that can be associated to specific data and/or metadata with data manipulation privileges. In accordance with another aspect of the claimed subject matter, the security component 406 can provides security at a granular level and/or global manner based at least in part upon the hierarchically structured data model with a hierarchical naming convention. In particular, the security component 406 can define security, authorization, and/or privileges in accordance with the physical hierarchy of the industrial automation environment, wherein sectors and/or portions of the environment can be associated to a specific security level that the metadata with data is associated therewith.

Figure 5:
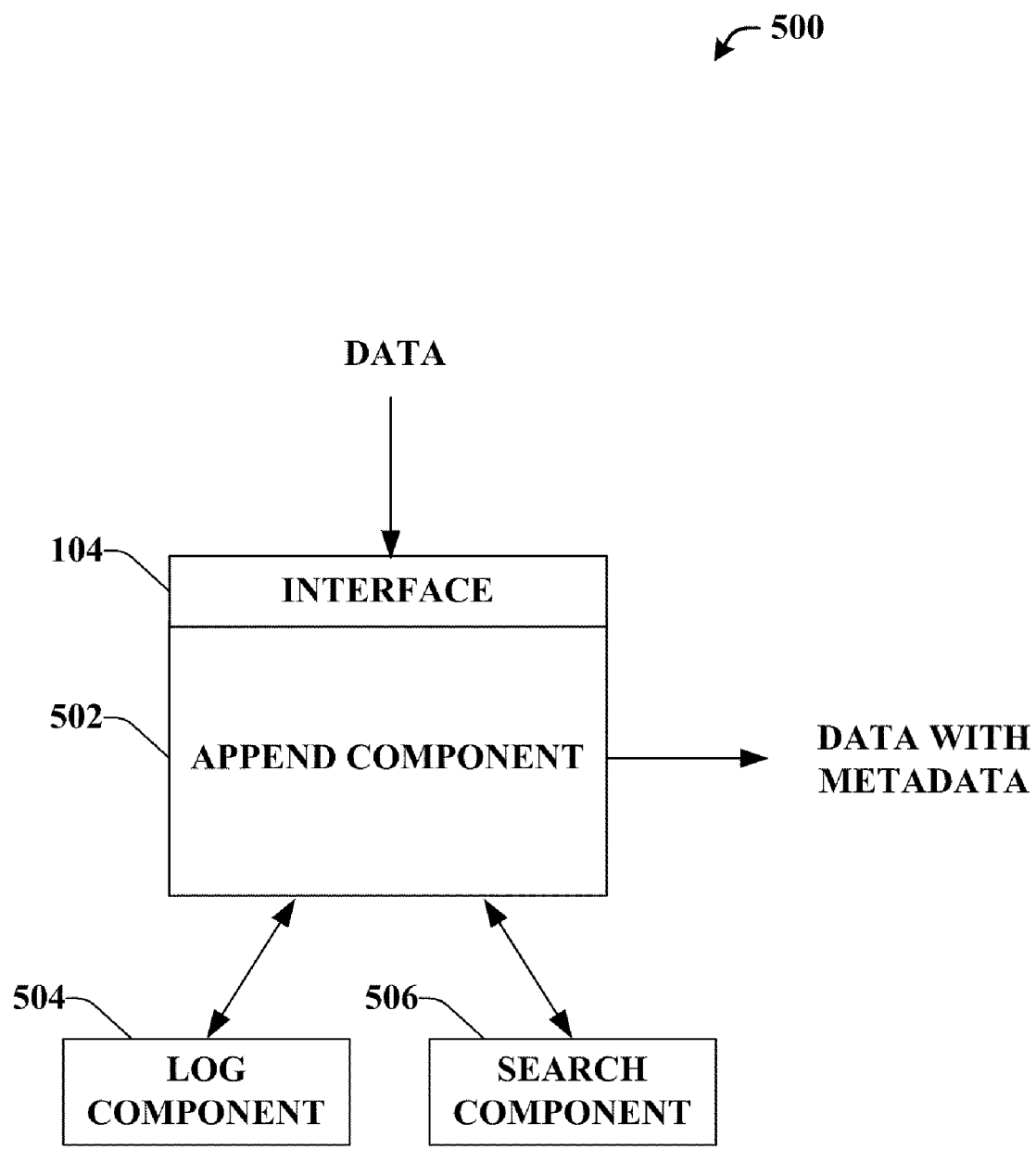
FIG. 5 illustrates a block diagram of an exemplary system that facilitates appending data related to an industrial automation environment with metadata.

FIG. 5 illustrates a system 500 that facilitates appending data related to an industrial automation environment with metadata. In particular, a common definition can utilize metadata associated to the industrial automation environment, wherein the common definition can include any and/or at least a portion of aspects of such system such that the common definition is accessible during manufacturing. An append component 502 can affix metadata to data received via the interface 104 such that the data describes data (e.g., data about data). The append component 502 can affix metadata to any data related to the industrial automation environment and/or the manufacturing systems associated with a product. It is to be appreciated that the append component 502 can be substantially similar to previous append components described above.

The append component 502 can utilize a search component 504 that allows querying of the system 500. In particular, the search component 504 can provide querying of any metadata to be affixed to data, any data to affix metadata, metadata affixed with data, and/or any other suitable data related to the system 500. For instance, a user can utilize the search component 504 to discover metadata related to a particular controller within a particular subcell, in a particular plant. It is to be appreciated that although the search component 504 is illustrated as a stand-alone component, the search component 504 can be incorporated into the append component 502, a stand-alone component, and/or any combination thereof.

In addition, the search component 504 can further implement a log component 506, wherein the log component 506 can store and/or track various data related to the system 500. For example, the log component 506 can track data manipulations to at least one of data related to the system 500, metadata, metadata affixed with data. In another instance, the log component 506 can log usernames and data access associated therewith. Thus, a user B can modify metadata with data W at time X, and modify data Y at time Z, wherein the log component 506 can store which data was accessed by user B and at which specific times.

Figure 6:
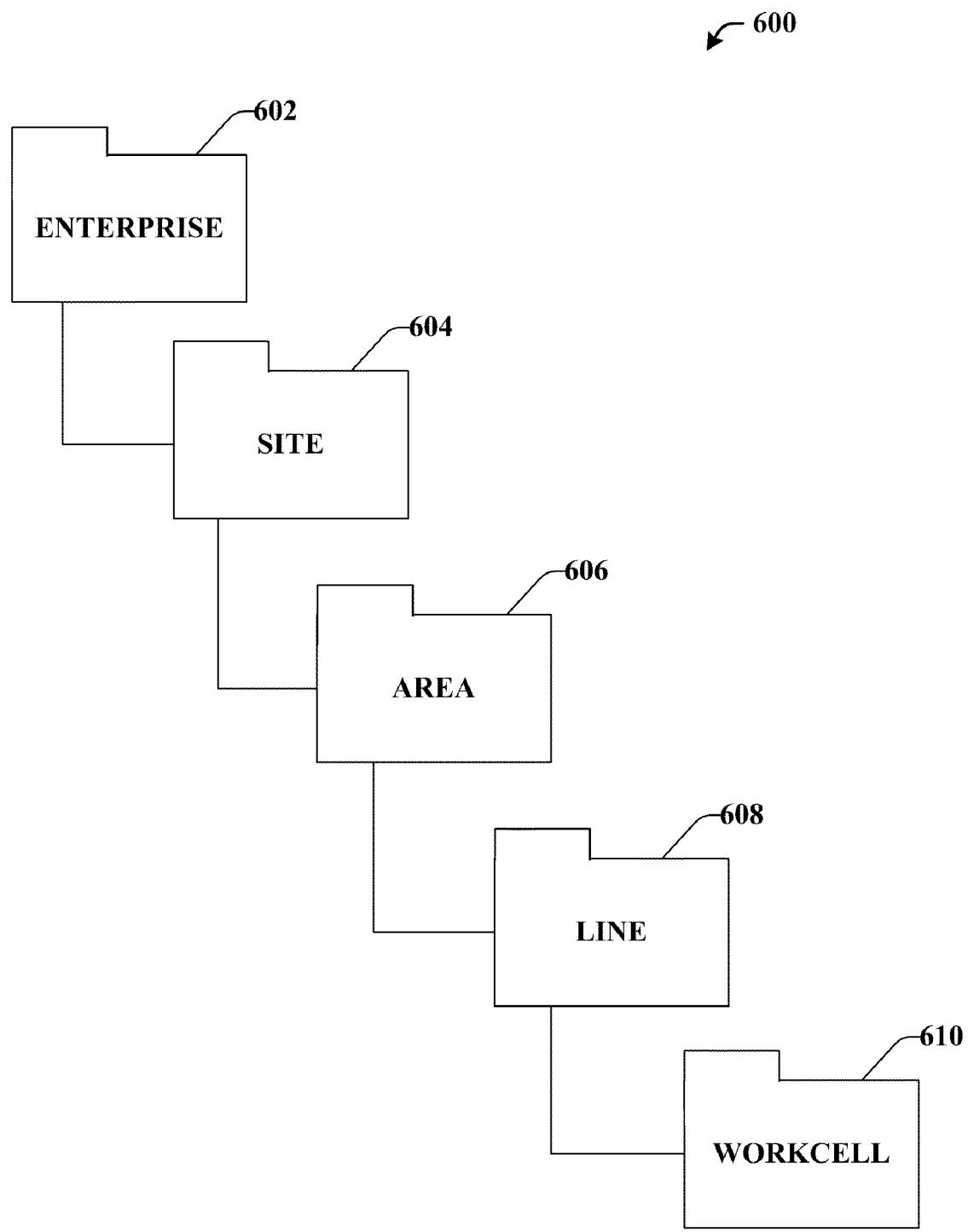
FIG. 6 illustrates a block diagram of an exemplary data structure that represents a hierarchical structure of an industrial automation system.

FIG. 6 illustrates a data structure 600 that represents a hierarchical structure of an industrial automation. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs and/or controllers can become more aware of data associated therewith. Furthermore, the hierarchy 600 can be customized by an owner of such hierarchy. For instance, more granular objects/levels can be defined within the hierarchy 600.

Figure 7:
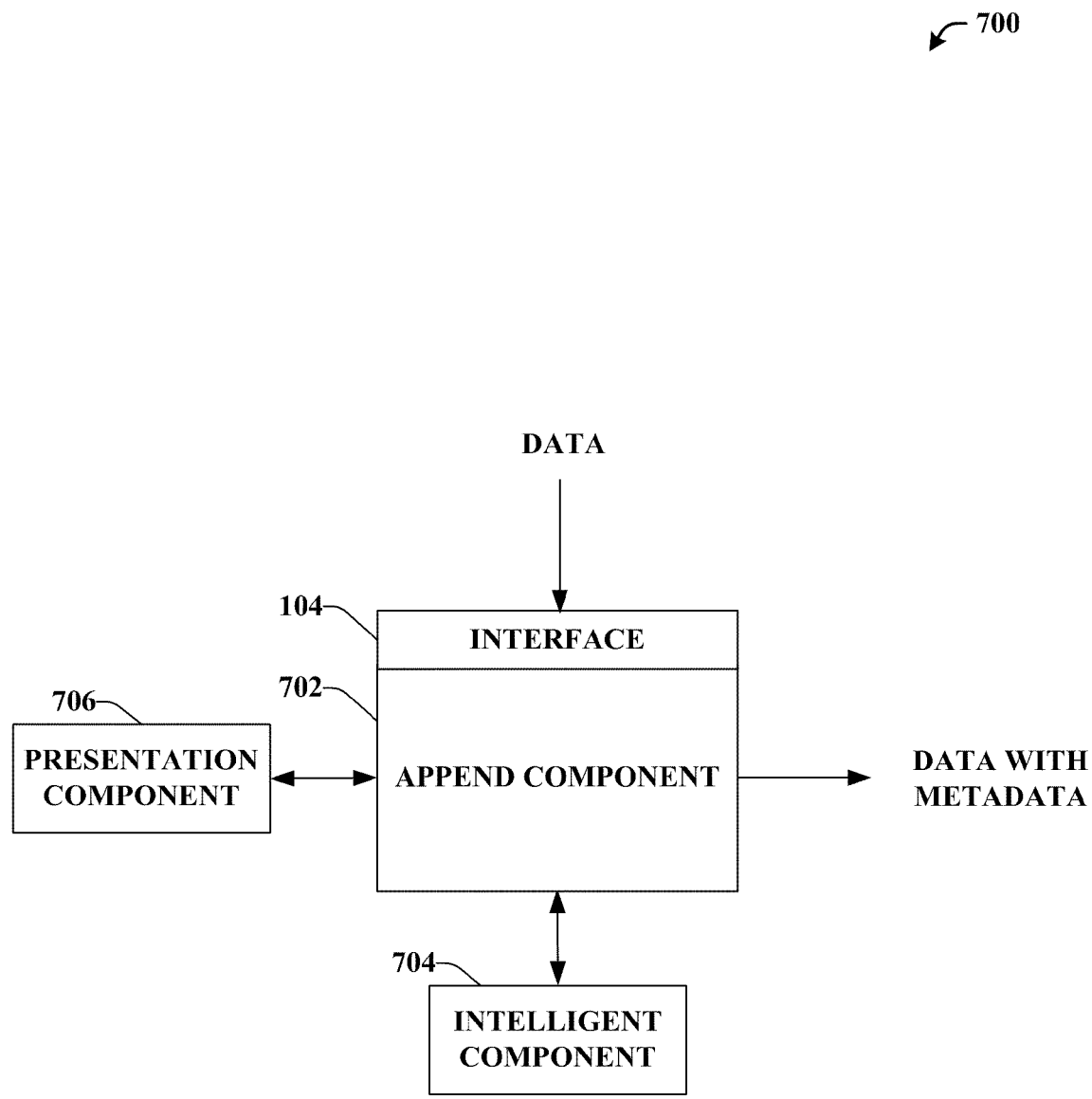
FIG. 7 illustrates a block diagram of an exemplary system that facilitates implementing a common definition that utilizes metadata for data related to an industrial automation environment.

FIG. 7 illustrates a system 700 that employs intelligence to facilitate implementing a common definition that utilizes metadata for data related to an industrial automation environment. The system 700 can include an append component and the interface 104 that can all be substantially similar to respective components and interfaces described in previous figures. The system 700 further includes an intelligent component 704. The intelligent component 704 can be utilized by the append component 702 to facilitate utilizing the generated metadata within the industrial automation environment. For example, the intelligent component 704 can infer metadata to affix to data, data that is to have metadata affixed, distribution of data and/or metadata with data to particular systems, appropriate templates to verify and/or validate metadata with data created and/or changed, etc.

It is to be understood that the intelligent component 704 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 706 can provide various types of user interfaces to facilitate interaction between a user and any component coupled to the append component 702. As depicted, the presentation component 706 is a separate entity that can be utilized with the append component 702. However, it is to be appreciated that the presentation component 706 and/or similar view components can be incorporated into the append component 702 and/or a stand-alone unit. The presentation component 706 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the append component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
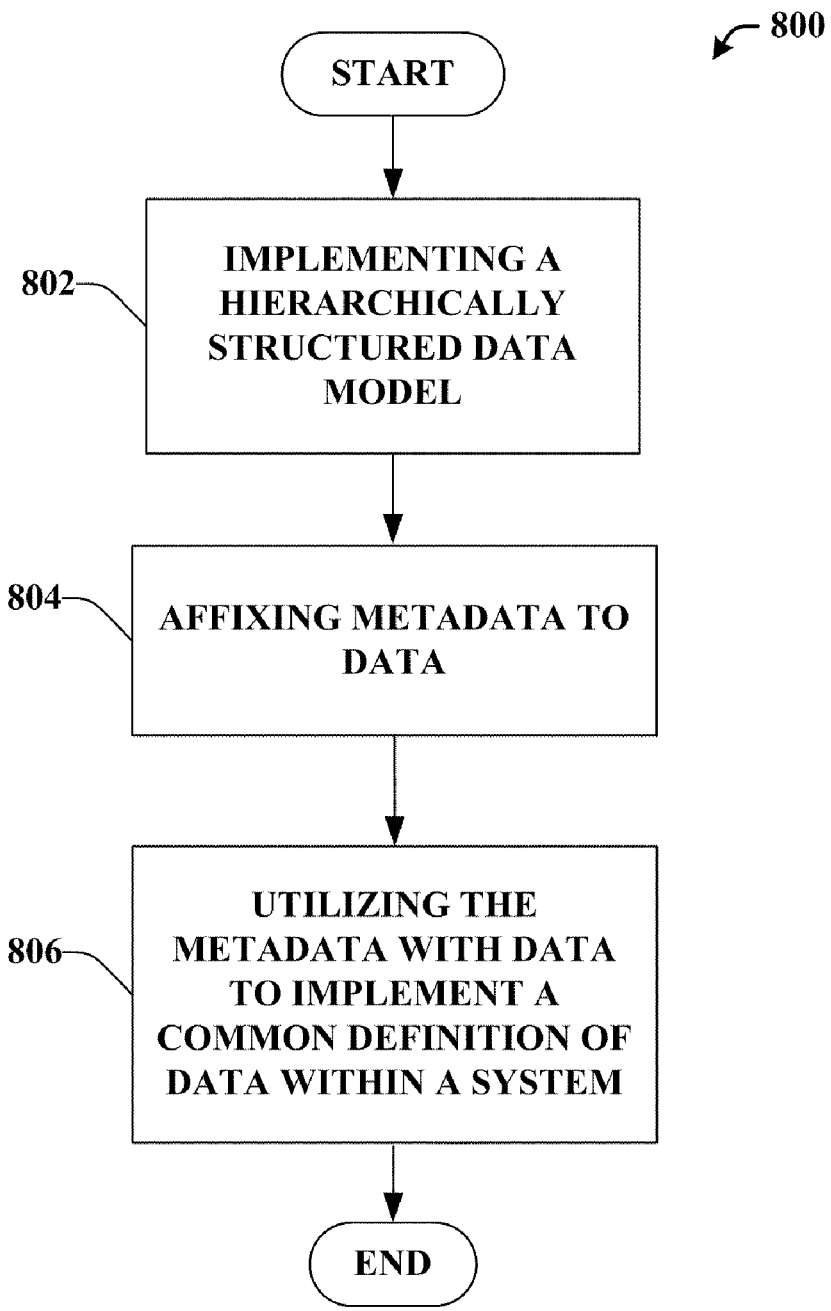
FIG. 8 illustrates an exemplary methodology for appending data related to an industrial automation environment with metadata.
Figure 9:
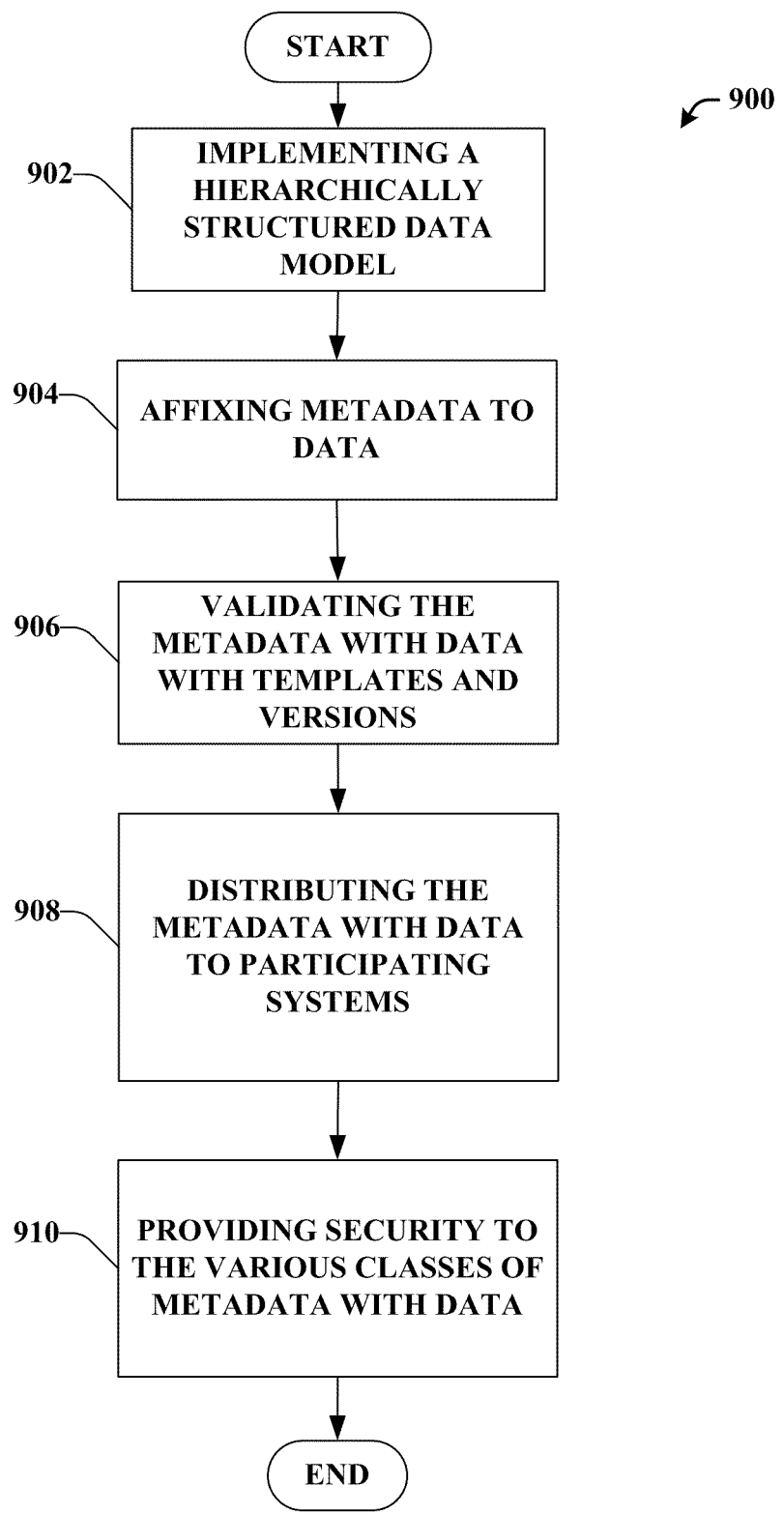
FIG. 9 illustrates an exemplary methodology that facilitates utilizing metadata appended to data related to an industrial automation environment with a controller that is associated with a hierarchically structured data model.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 is illustrated for appending data related to an industrial automation environment with metadata. At reference numeral 802, a hierarchically structured data model can be implemented that utilizes a naming convention. The naming convention can represent a device and/or variable, wherein the representation of such device and/or variable includes the physical location within the industrial automation environment. It is to be appreciated that the device can be, but is not limited to, a roller, a station, a welder, a scanner, a belt conveyor, a pump, a press, a fan, etc., or any other suitable device utilized in automation systems. Furthermore, the device can be controlled by a controller. It is to be appreciated that the controller can contain software components and hardware components having inputs and/or outputs that can be utilized in connection with automating an industrial manufacturing device/process.

In one particular example, the hierarchical data model can be modeled after ISA_S88, ISAS95, and/or a combination thereof. It is understood, however, that any manner of hierarchically configuring a factory can be utilized in connection with modeling. For example, the physical hierarchy of the industrial automation environment can be indicative of a factory-level, a cell-level, a subcell level, input and outputs within each subcell, and the like. Thus, the naming convention includes the physical hierarchy within the tag, reference and/or name of the device and/or logical variable. For example, a first photo eye on controller 5, in cell A, in the Smithville Plant that is for packaging associated with a Chip Factory can be referenced as "ChipFactory/Packaging/SmithvillePlant/CellA/Controller5/photoeye1."

At reference numeral 804, metadata can be affixed to data that relates to the hierarchically structured data model. The metadata can be affixed to any data related to the industrial automation environment and/or the manufacturing systems associated with a product. For instance, the manufacturing of a product is driven by a demand, wherein the demand can be represented by a set of instructions and/or data. The instruction set combined with a configuration of manufacturing and/or automation systems can provide manufacturing and/or industrial automation environments with the necessary data to produce products to meet the demand. Moreover, collected data or data related to the product can be utilized to manufacture the product. Thus, informative metadata can be appended to the data received (e.g., instruction set, configuration of manufacturing and/or automation systems, collected data, etc.) to provide the common definition utilized in connection with the hierarchically structured data model.

At reference numeral 806, the metadata with data can be utilized to implement a common definition of data within a system. The common definition can be utilized with the industrial automation environment such that any data received is defined from the point where demand is presented to manufacturing to the point where the record about how a product was manufactured is returned. Furthermore, the common definition that utilizes metadata with data related to the industrial automation environment to allow constant accessibility to any component, device, variable, and/or disparate system. In addition, the following can be provided by affixing metadata to data to create a common definition: validation mechanisms to ensure integrity of metadata affixed to data and/or any manipulations to the metadata affixed to data utilizing at least a portion of a template implementing a service (e.g., discoverable service, set of services, etc.); maintaining a version of metadata affixed to data wherein any data related to the manufacturing can include multiple versions; seamless distribution to participating systems during communication outages; distribution to various system endpoints from external systems to allow for configuration based at least in part upon a template; modification of templates and/or metadata affixed to data can be restricted by a set of rules and/or patterns; and enhanced security measures to ensure the integrity of any data manipulation.

FIG. 9 illustrates a methodology 900 that facilitates utilizing metadata appended to data related to an industrial automation environment with a controller that is associated with a hierarchically structured data model. At reference numeral 902, a hierarchically structured data model can be implemented that utilizes a naming convention. The naming convention can represent a device and/or variable, wherein the representation of such device and/or variable includes the physical location within the industrial automation environment. For example, the physical hierarchy of the industrial automation environment can be indicative of a factory-level, a cell-level, a subcell level, input and outputs within each subcell, and the like. At reference numeral 904, metadata is affixed to data (discussed supra). Thus, informative metadata can be appended to the data received (e.g., instruction set, configuration of manufacturing and/or automation systems, collected data, etc.) to provide the common definition utilized in connection with the hierarchically structured data model.

At reference numeral 906, the metadata with data can be validated with templates and versions. The integrity can be ensured with the manipulations related to the metadata with data. Thus, any changes to the metadata can be maintained and/or versioned such that any and all data related to the manufacturing and/or industrial automation environment. The consistency can be ensured with the metadata and the version of such metadata utilized. Moreover, the multiple versions of metadata with data can be provided based at least in part upon various manipulations and/or changes made therewith.

Furthermore, the integrity of data manipulations and/or metadata manipulations can be validated by utilizing a template. The template and/or appropriate template can be validated utilizing, for instance, a discoverable service and/or a set of services. Not only is the integrity of existing data and/or metadata validated, any created metadata with data can be verified. It is to be appreciated that any metadata with data described above can follow defined patterns and/or templates for any data. The manipulation of the metadata with data and/or the manipulation of templates can be restricted by a set of rules and/or patterns. These rules and/or patterns can be self-describing and can be referenced by a set of callable services each time extensibility is necessary. Moreover, due to the nature and complexity of modern manufacturing and/or automation systems, a plurality of patterns and/or templates can be utilized for multiple users and/or applications. Thus, the metadata with data can be extended from a shipped product or pre-defined information.

At reference numeral 908, the distribution of the data with metadata to systems and/or components can be provided. For instance, at least one of a directory service, a caching service, and a storage service can be utilized to enable the metadata with data to be distributed to a participating system. Moreover, the distribution of the metadata with data can be implemented to a participating system during a communication outage and/or loss. In particular, the metadata with data can be distributed to server based applications and/or controller based applications. In another example, the demand from an external system can be picked up by a system endpoint, wherein the system endpoints can be configured for the appropriate template(s) based at least in part upon the expected data for such particular system endpoint.

At reference numeral 910, security to the various classes of metadata can be employed. Enhanced security measures can ensure the integrity of any data manipulation related to the hierarchically structured data model. In other words, a security mechanism with at least two or more levels can be provided in relation to any modifications and/or manipulations of any metadata with data and/or templates. In one example, usernames and respective passwords can be utilized that can be associated to specific data and/or metadata with data manipulation privileges.

Figure 10:
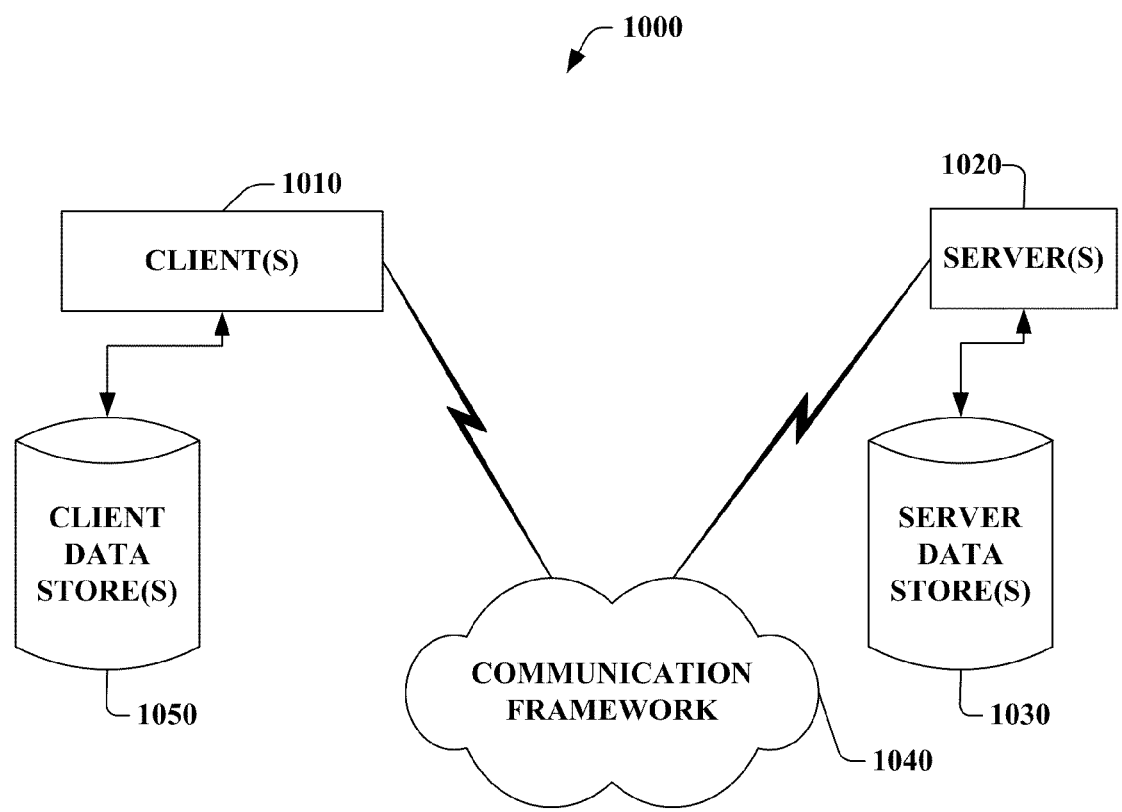
FIG. 10 illustrates an exemplary networking environment, wherein the novel aspects of the claimed subject matter can be employed.
Figure 11:
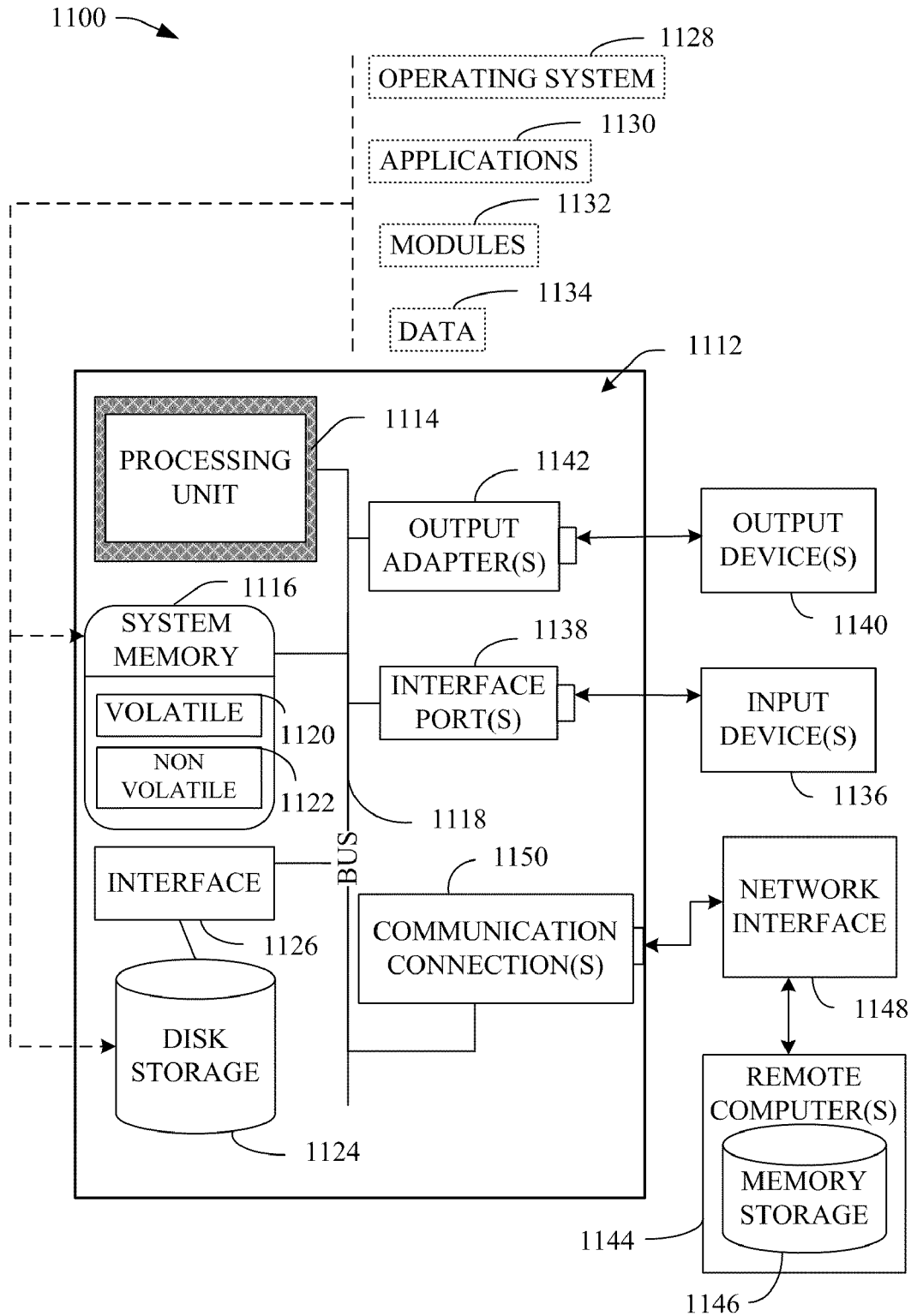
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A data management utility for use in an industrial automation environment, the environment having at least one industrial controller that processes a data object stored in the industrial controller, the data object storing at least one of collected data related to the automation environment or configuration data for the industrial controller, the utility comprising:
  a processor configured to:
    receive the data object stored in the industrial controller;
    associate metadata with the data object, wherein the metadata relates to a hierarchically structured data model associated with the industrial controller and implements a common definition of data related to the industrial automation environment, wherein the hierarchically structured data model represents at least a physical hierarchical location within the industrial automation environment that includes at least one tag and at least one device, wherein the physical hierarchical location is indicative of at least a portion of a factory-level, a cell-level, a subcell level, an input within a subcell, or an output within a subcell; and
    validate the metadata utilizing a template and at least one of a discoverable service or a set of services.

2. The data management utility of claim 1, wherein the processor is further configured to log manipulation of the metadata.

3. The data management utility of claim 1, wherein the processor is further configured to provide the metadata to a search component.

4. The data management utility of claim 3, wherein the search component is configured to perform a search based on the metadata.

5. The data management utility of claim 3, wherein the search component is configured to perform a search based on the data stored in the data object.

6. The data management utility of claim 1, wherein the processor is further configured to provide the metadata to a log component.

7. The data management utility of claim 1, wherein the processor is further configured to provide the metadata to a presentation component.

8. A method that facilitates data management in an industrial automation environment, comprising:
  employing one or more processors executing computer executable instructions embodied on one or more computer readable storage mediums to perform the following acts:
    receiving a data object stored in an industrial controller and storing data collected from the industrial automation environment;
    associating metadata with the data object, wherein the metadata relates to a hierarchically structured data model associated with the industrial controller and implements a common definition of data related to the industrial automation environment, wherein the hierarchically structured data model represents at least a physical hierarchical location within the industrial automation environment that includes at least one tag and at least one device, wherein the physical hierarchical location is indicative of at least a portion of a factory-level, a cell-level, a subcell level, an input within a subcell, or an output within a subcell; and
    validating the metadata utilizing a template and at least one of a discoverable service or a set of services.

9. The method of claim 8, further comprising logging manipulation of the metadata.

10. The method of claim 8, further comprising providing the metadata to a search component.

11. The method claim 8, further comprising searching the metadata based on a physical location.

12. The method of claim 8, further comprising presenting the data to a user.

13. A method that facilitates data management in an industrial automation environment, comprising:
  employing one or more processors executing computer executable instructions embodied on one or more computer readable storage mediums to perform the following acts:
    creating configuration data for an industrial controller;
    associating metadata with the configuration data, wherein the metadata relates to a hierarchically structured data model associated with the industrial controller and implements a common definition of data related to the industrial automation environment, wherein the hierarchically structured data model represents at least a physical hierarchical location within the industrial automation environment that includes at least one tag and at least one device, wherein the physical hierarchical location is indicative of at least a portion of a factory-level, a cell-level, a subcell level, an input within a subcell, or an output within a subcell; and validating the metadata utilizing a template and at least one of a discoverable service or a set of services.

14. The method of claim 13, further comprising presenting the metadata to a user.

15. The method of claim 13, further comprising providing the metadata to a search component.

16. The method claim 13, further comprising searching the metadata based on a physical hierarchical location.

17. The method of claim 13, further comprising presenting the configuration data to a user.

18. The method of claim 13, further comprising distributing the configuration data to the first industrial controller.

19. The method of claim 13, further comprising distributing the configuration data to another industrial controller.

20. The method of claim 13, further comprising logging manipulation of the metadata.

* * * * *